(12) United States Patent
Gasda et al.

(10) Patent No.: US 8,980,502 B2
(45) Date of Patent: Mar. 17, 2015

(54) PORE FORMATION BY IN SITU ETCHING OF NANOROD PEM FUEL CELL ELECTRODES

(75) Inventors: Michael David Gasda, Mountain View, NY (US); Glenn Eisman, Niskayuna, NY (US); Daniel Gall, Loudonville, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 300 days.

(21) Appl. No.: 13/378,113

(22) PCT Filed: Jul. 8, 2010

(86) PCT No.: PCT/US2010/041375
§ 371 (c)(1),
(2), (4) Date: Dec. 14, 2011

(87) PCT Pub. No.: WO2011/005965
PCT Pub. Date: Jan. 13, 2011

(65) Prior Publication Data
US 2012/0107723 A1 May 3, 2012

Related U.S. Application Data

(60) Provisional application No. 61/223,753, filed on Jul. 8, 2009.

(51) Int. Cl.
*H01M 4/00* (2006.01)
*H01M 8/10* (2006.01)
*H01M 4/88* (2006.01)

(52) U.S. Cl.
CPC .......... *H01M 8/1004* (2013.01); *H01M 4/8814* (2013.01); *H01M 4/8817* (2013.01); *H01M 4/8871* (2013.01); *H01M 4/8875* (2013.01); *H01M 4/8892* (2013.01); *Y02E 60/521* (2013.01)
USPC .......... 429/523; 429/492; 429/524; 429/526; 429/525; 429/535

(58) Field of Classification Search
USPC .......... 429/492, 523, 525, 526, 535
See application file for complete search history.

(56) References Cited

U.S. PATENT DOCUMENTS

| 6,641,948 | B1 * | 11/2003 | Ohlsen et al. ............ 429/480 |
| 2003/0235753 | A1 * | 12/2003 | Champion ............ 429/44 |
| 2004/0166400 | A1 * | 8/2004 | Gascoyne et al. ............ 429/44 |
| 2004/0180252 | A1 | 9/2004 | Wortman et al. |
| 2004/0224217 | A1 | 11/2004 | Toops |
| 2005/0006754 | A1 * | 1/2005 | Arik et al. ............ 257/712 |
| 2005/0061664 | A1 | 3/2005 | Balan et al. |

(Continued)

FOREIGN PATENT DOCUMENTS

WO  WO 00/41808  *  7/2000

OTHER PUBLICATIONS

International Search Report of PCT/US2010/041375 dated Feb. 28, 2011.

*Primary Examiner* — Stewart Fraser
*Assistant Examiner* — Olatunji Godo
(74) *Attorney, Agent, or Firm* — Heslin Rothenberg Farley & Mesiti P.C.

(57) ABSTRACT

The invention includes a method for use in creating electrochemical electrodes including removing a supporting structure in situ after the assembly of the electrochemical cell.

16 Claims, 13 Drawing Sheets

(56) References Cited

U.S. PATENT DOCUMENTS

| | | |
|---|---|---|
| 2005/0095479 A1* | 5/2005 | Mardilovich et al. .......... 429/30 |
| 2006/0040168 A1* | 2/2006 | Sridhar .......................... 429/40 |
| 2006/0183006 A1* | 8/2006 | Liu et al. ........................ 429/13 |
| 2007/0003823 A1* | 1/2007 | Mei et al. ....................... 429/44 |
| 2007/0212538 A1* | 9/2007 | Niu ............................... 428/367 |
| 2007/0270305 A1* | 11/2007 | Pak et al. ..................... 502/172 |

\* cited by examiner

PORE FORMATION BY IN SITU ETCHING OF NANOROD PEM FUEL CELL ELECTRODES

CROSS REFERENCE TO RELATED APPLICATIONS

This application is a national phase entry under 35 USC §371 of PCT International Application PCT/US2010/041375, filed Jul. 8, 2010, and published under PCT Article 21(2) in English as WO 2011/005965 on Jan. 13, 2011. PCT/US2010/041375 claimed priority from U.S. Provisional Application No. 61/223,753 filed Jul. 8, 2009. Both are incorporated herein by reference in their entirety.

FEDERALLY SPONSORED RESEARCH

The following invention was made with government support under contract numbers DGE 0504361, DMR 0645312, and CMMI 0653843 awarded by the National Science Foundation (NSF). The Government has certain rights in this invention.

FIELD OF THE INVENTION

The invention is a process for creating electrochemical electrodes in which a supporting material is removed in situ, after the assembly of the electrochemical cell.

BACKGROUND OF THE INVENTION

Proton exchange membrane (PEM) fuel cells show great promise for future power generation applications due to their high efficiency and low emissions, but cost remains one of the chief obstacles to widespread commercialization. The platinum (Pt) catalyst, particularly at the cathode, constitutes a significant fraction of the overall cost of the fuel cell system, and much effort has therefore been directed toward increasing the Pt-specific power density, that is, the power output per gram of Pt. This goal can be accomplished either by replacing the precious metal with a lower-cost catalyst, or by optimizing the structure to utilize the Pt more effectively. Sputter deposition is a promising method for manufacturing catalyst layers with ultra-low Pt loadings, because the Pt loading, morphology and thickness can be precisely controlled, resulting in a uniform layer in a simple and scalable process.

In order to completely control the assembly of the three-phase boundary, where oxygen, electrons, and ions meet to react at a catalyst site, Pt sputtering needs to be combined with processing steps that control the overall electrode structure, and in particular the electrode porosity. Challenges are associated with the complexity of the involved processing steps and particularly with the bonding of fragile nanostructured electrodes to the membrane. For example, Hayase et al. have reported excellent results for a porous Si catalyst support formed by photolithographic patterning and subsequent wet etching, but the porous Si is brittle and therefore limits the clamping pressure that can be applied to the cell [M. Hayase, T. Kawase and T. Hatsuzawa, *Electrochem. Solid-State Lett.,* 7, A231 (2004)].

SUMMARY OF THE INVENTION

To overcome some of these challenges, 3D-electrode structures have been designed that contain sacrificial support materials to provide mechanical support to the catalyst during bonding with the membrane and the gas diffusion layer (GDL). These structures are subsequently removed by electrochemical methods after integration into the fuel cell. This has the advantage that the high porosity, which is important to provide efficient mass transport in the electrode but often entails fragile nanostructures with poor mechanical integrity, is only formed after exposure to the mechanical stresses associated with fuel cell assembly. The controlled removal of structural supports after electrochemical cell assembly represents a new promising approach to fabricate porous three-dimensional electrodes.

By using glancing angle deposition (GLAD), atomic shadowing during line-of-sight physical vapor deposition from highly oblique angles results in an underdense structure of vertically aligned nanocolumns, which are useful for such potential applications as sensors and catalyst supports.

Electrochemical cell performance may be dramatically increased by this invention. For instance, the consensus literature estimates are that as little as 10% of the available surface area of PEM fuel cell catalysts is actually utilized in the electrode. Much of that unavailable surface area could possibly be accessible if pores were etched within the electrode.

Therefore, one embodiment of the invention provides a method for use in forming an electrochemical cell, including providing a sacrificial support on a substrate; depositing a catalyst on the sacrificial support; bringing the catalyst into contact with an electrolyte; removing the substrate; integrating the sacrificial support, catalyst and electrolyte into an electrochemical cell; and removing at least a portion of the sacrificial support during the operation of the electrochemical cell.

It is important to note that at least a portion of the sacrificial support is removed during the normal operation of the electrochemical cell, that is, the sacrificial support is removed by electrochemical means. The controllable formation of pores within an electrode occurs after assembly into an operational electrochemical cell. A separate step is not required for this removal, resulting in at least three advantages:

1. The sacrificial support provides mechanical stability to the catalyst until the electrochemical cell is assembled;
2. The removal of the sacrificial support in this manner results in the formation of pores which allows access to an increased catalyst surface area; and
3. The ability to remove the sacrificial support without the requirement of an extra removal step avoids additional time and cost. The etching saves a processing step, meaning the process is simpler and more economical.

One embodiment of the invention is a component for an electrochemical cell which includes a sacrificial support of substantially amorphous carbon nanorods and a catalyst in contact with the outside of the sacrificial support.

Another embodiment of the invention is a component for an electrochemical cell, which includes water-soluble salt as a sacrificial support and a catalyst in contact with the outside of the sacrificial support.

DETAILED DESCRIPTION OF THE INVENTION

Figure 1:
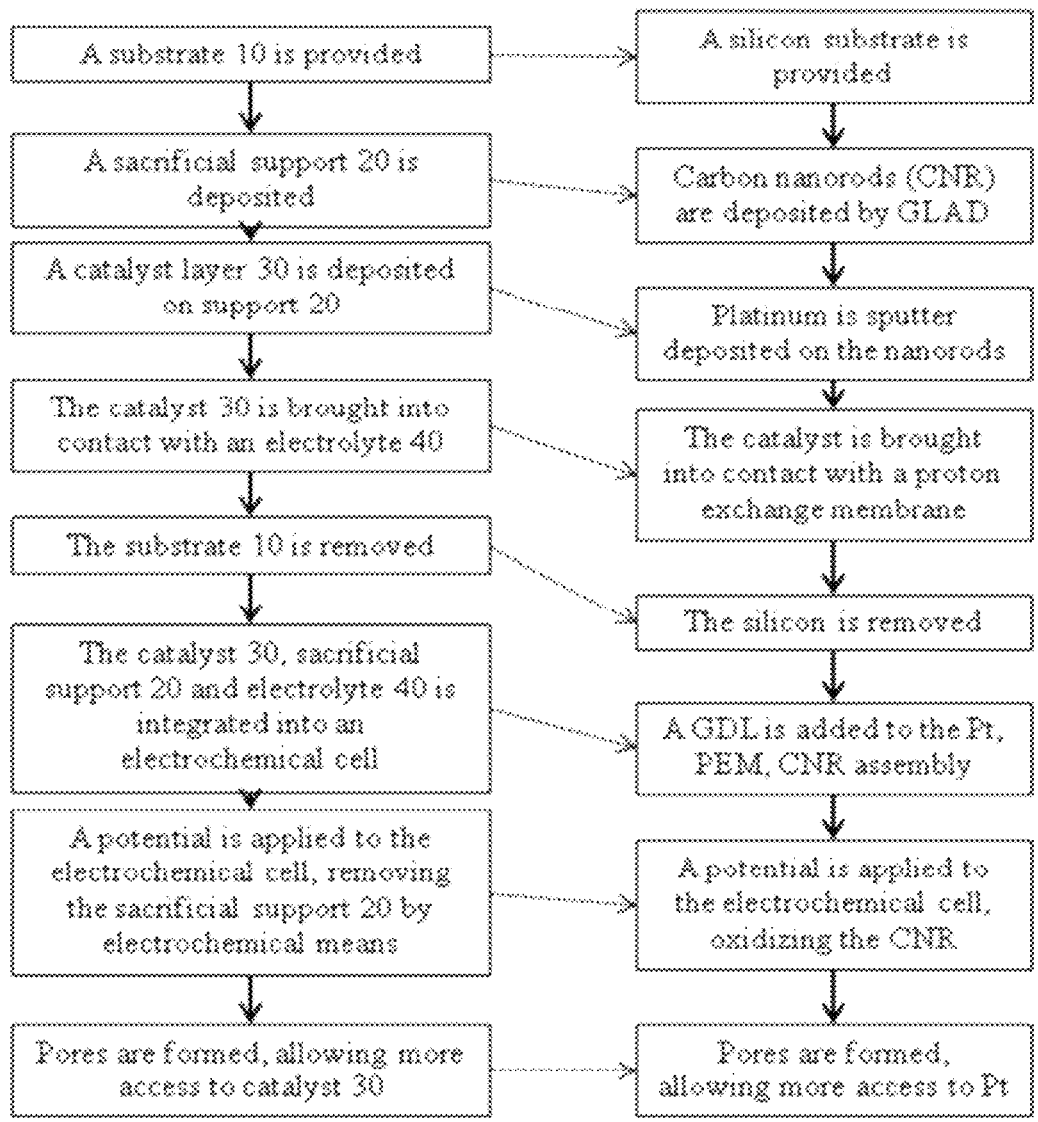
FIG. 1 shows a method of assembly of an electrochemical cell by an embodiment of the invention. The general embodiment is on the left, and a corresponding specific example is shown on the right.

In one embodiment, the invention is a process for creating electrodes for electrochemical cells in which high-surface area nanostructures are fabricated in situ by electrochemically etching a sacrificial support material. Removing a material after it has been built into the cell opens up pores within the electrode whose size and density can be controlled, resulting in higher efficiency and catalyst utilization. In situ etching results in high-surface area nanostructures which cannot be practically fabricated outside the cell and transferred to the membrane without damaging the delicate structure. The etching process is fast and cheap to implement, and eliminates costly and time-consuming processing steps outside the cell.

An electrochemical cell refers to any system containing two electrodes (typically an anode and a cathode) and an electrolyte. These systems can either 1) facilitate a chemical reaction by the addition of electrical energy or 2) use chemical reactions to produce electrical energy. Non-limiting examples of such cells are fuel cells (including proton exchange membrane (PEM) fuel cells), batteries, hydrogen pumps, water electrolyzers and ultracapacitors. For purposes of this application, low temperature electrochemical cells (i.e., under 200° C.) are preferred.

The electrode could be a fuel cell anode or cathode, or the anode or cathode electrode of any electrochemical cell such as water electrolyzers, electrochemical hydrogen pumps, or batteries.

FIGS. 1-7 illustrate one embodiment of the invention, which provides a method for use in forming an electrochemical cell, including providing a sacrificial support 20 on a substrate 10; depositing a catalyst 30 on the sacrificial support 20; bringing the catalyst 30 into contact with an electrolyte 40; removing the substrate 10; integrating the sacrificial support 20, catalyst 30 and electrolyte 40 into an electrochemical cell; and removing at least a portion of the sacrificial support 20 during the operation of the electrochemical cell.

FIG. 1 shows a flow chart of the process of assembling an electrochemical cell by an embodiment of the invention. The left-hand flow chart demonstrates the general process, while the right-hand flow chart shows the process as it could be utilized in a PEM fuel cell. Dotted arrows link the step in the general process with the step in the PEM process, merely for clarity. The initial step involves providing a substrate upon which the sacrificial support can be grown. In the PEM example, the substrate is silicon, and the sacrificial support comprises carbon nanorods deposited by glancing angle deposition (GLAD). A catalyst layer is then deposited on the sacrificial support. Platinum is used in the PEM example, and the Pt can be deposited by sputtering. Next, the catalyst (still contained on the outside of the sacrificial support) is brought into contact with an electrolyte. A proton exchange membrane, such as Nafion®, can be used in the PEM example. Once the electrolyte is in contact with the catalyst, the substrate is removed. In the case of the PEM example, the Pt-coated nanorods may be embedded in the membrane and the silicon substrate can easily be removed (e.g., peeled away). The catalyst-coated sacrificial support and the electrolyte can then be integrated into an electrochemical cell. In the PEM example, for instance, a GDL could be added to the Pt-coated carbon nanorods+PEM assembly to form the cathode, and an anode and other fuel cell hardware are added. A current is then applied to the electrochemical cell, causing the removal of at least a portion of the sacrificial support by electrochemical means. The carbon nanorods of the PEM example would be oxidized by this operation of the PEM fuel cell. Pores are formed by this removal of the support, and more of the catalyst is available and utilized for the reactions of the electrochemical cell.

Figure 2:
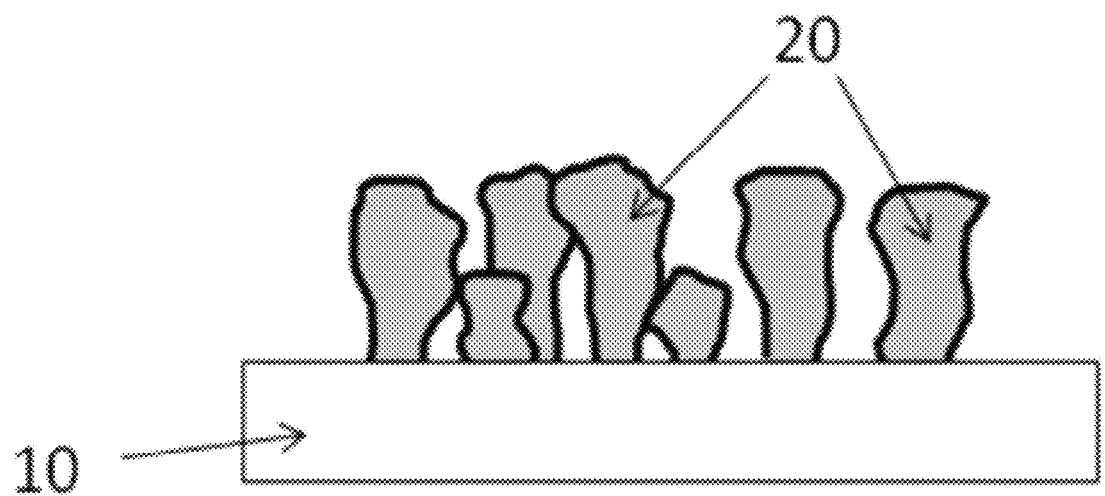
FIG. 2 is an illustration of the initial steps of the method in accordance with the present invention. A sacrificial support is shown on a substrate.

FIG. 2 illustrates the initial steps of the method for use in forming an electrochemical cell. A sacrificial support 20 is grown on a substrate 10. The substrate 10 can be any material upon which additional materials can be deposited. In some embodiments of the invention, a sacrificial support 20 is grown on the substrate by GLAD. "GLAD" (glancing angle deposition) refers to the deposition angle being oblique, rather than normal to the surface. In other embodiments, the sacrificial support 20 is grown on the substrate 10 by sputter-coat deposition. "Sputter-coat deposition" (or "sputter deposition" or "sputtering") refers to how the atoms are put into the vapor form that are then deposited on the substrate. Further, the substrate material 10 should be removable after the sacrificial support 20 is secured by an electrolyte 30 (see next figures). In some embodiments of the invention, the substrate is silicon. In FIGS. 2 to 6, the shapes of the sacrificial support 20 are merely meant to be illustrative and are not necessarily indicative of the actual shape or pattern of the support. The same is true for the substrate 10 in FIGS. 2 to 4, in that the rectangle is merely meant to represent that a substrate is in that position and is not necessarily indicative of the actual shape of the substrate.

The sacrificial support 20 can be any material that is removable during the operation of the electrochemical cell. A salt or other water-soluble material, such as NaCl or KCl, will be dissolved and washed out of the membrane by product water and reactant stream humidification. In some embodiments of the invention, the sacrificial support 20 comprises water-dissolvable salt or salts. Any metal that can be electrochemically oxidized and flushed from the electrode would also be acceptable for the purposes of the invention. Substantially amorphous carbon nanorods could be oxidized and removed easily during the operation of the cell. Etching a material such as substantially amorphous carbon is as simple as briefly bringing the cell to a water electrolysis potential. The oxide (mostly $CO_2$) will not poison the membrane or catalyst as it leaves the cell, and no further processing steps are required to reactivate ion-exchange sites.

A water-dissolvable salt (or water-soluble salt) is any salt that can dissolve in water. These salts include, but are not limited to, chlorides, fluorides, bromides, phosphates, nitrates, and carbonates of any group I or II metal (Li, Na, Ca, etc.). These salts can form a support by sputter-deposition [for instance, by DC (direct current) or RF (radio frequency)] of a target made of the desired material; for instance, one could introduce chlorine gas into a plasma containing the anion (such as, for instance, NaCl). These water-soluble salts can form a support which doesn't need to be dissolved away in a separate step, but rather is etched away by humidification and product water during ordinary operation of the electrochemical cell.

Amorphous carbon is described as an allotrope of carbon exhibiting substantially no long range order or crystal structure. At the nanoscale, the atomic bonding within amorphous carbon is characterized by a mixture of graphitic ($sp^2$ hybridized bonds), diamondlike ($sp^3$ hybridized bonds), and dangling bonds. Amorphous carbon therefore does not have any true crystalline structure; "amorphous" literally means no shape, which is in contrast to the carbon atoms as arranged in nanotubes and other fullerenes. These non-amorphous structures have a definite spatial and directional relationship between nearest neighbors (and next-nearest neighbors, etc.), whereas in amorphous carbon there is variation such that once you get to next-next-nearest neighbor (or next-next-next-nearest neighbor), the distance and/or direction between the two atoms is random. Therefore, the term "substantially amorphous", when used with respect to carbon nanorods, refers to carbon structures in which there is no crystalline structure.

"Substantially amorphous carbon nanorods" and "carbon nanorods" are distinguished from other carbon nano-forms. Carbon nanotubes and other fullerenes, for instance, are rolled-up graphene sheets, i.e., sheets of carbon atoms each with three nearest neighbors. If these sheets are rolled flat they form graphite. The carbon nanorods of the invention, on the other hand, are formed of fully dense amorphous carbon that is more easily oxidized. Carbon nanotubes and other fullerenes are much more difficult to oxidize than are the substantially amorphous carbon nanorods. In fact, carbon nanotubes are being researched for use as catalyst supports because they are so stable (and too stable for the purposes of the instant invention).

In some embodiments of the invention, the sacrificial support 20 may include carbon nanorods. In some embodiments of the invention, the carbon nanorods are between about 10 nm to 25,000 nm wide. In some embodiments of the invention, the carbon nanorods are between about 20 nm to 800 nm wide. In some embodiments of the invention, the carbon nanorods are between about 30 nm to 500 nm wide. In some embodiments of the invention, the carbon nanorods are between about 50 nm to 200 nm wide. In some embodiments of the invention, the carbon nanorods are about 150 nm wide.

In some embodiments of the invention, the carbon nanorods are about 0.2 to 4.0 µm long. In some embodiments of the invention, the carbon nanorods are about 0.4 to 2.5 µm long. In some embodiments of the invention, the carbon nanorods are about 0.5 to 1.5 µm long.

One embodiment of the invention is a component for an electrochemical cell which includes a sacrificial support 20 of substantially amorphous carbon nanorods and a catalyst 30 in contact with the outside of the sacrificial support 20.

Figure 3:
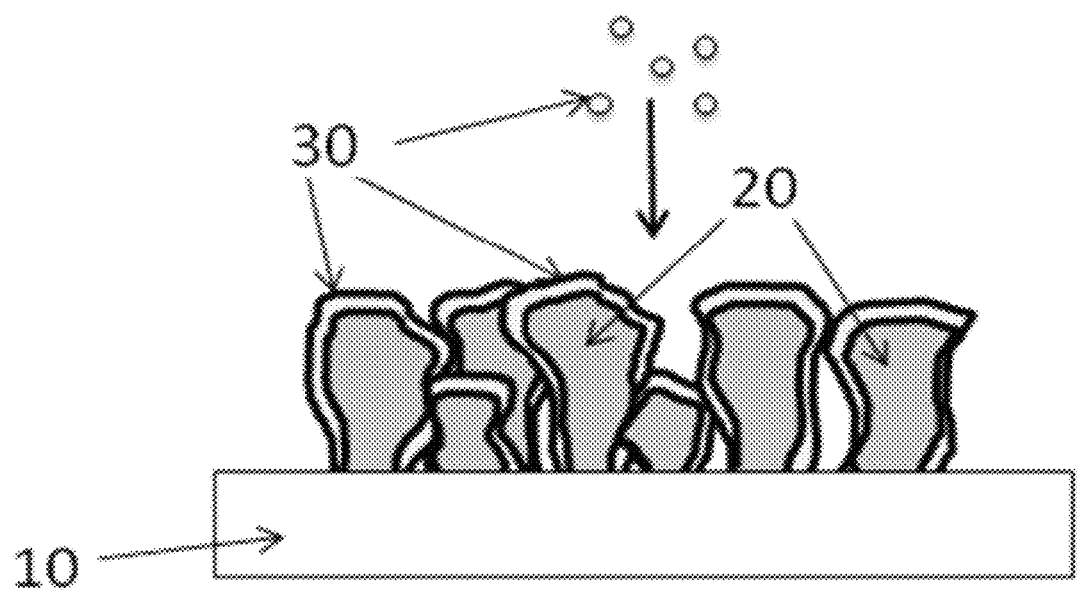
FIG. 3 is an illustration of a catalyst deposited on a sacrificial support, in accordance with the present invention.

FIG. 3 illustrates the addition of a catalyst 30 to the sacrificial support 20 on the substrate 10. The catalyst 30 used in the invention can be any material which participates in the oxygen reduction reaction. Non-limiting examples include precious metals (Pt, Pd, Rh, Ru, Ir, Os) or alloys (Pt—Ru, Pt—Au, Pt—Ni, Pt—Co, Pt—Fe, Pt—Cu), transition metal nitrides (CrN, TiN, WN) or carbides, electrochemically dealloyed catalysts, and the like. In some embodiments of the invention, the catalyst 30 is a precious metal, and in some embodiments, the precious metal is platinum. In other embodiments, the catalyst 30 is a precious metal alloy and, in some of these embodiments, the precious metal of the alloy is platinum.

In some embodiments of the invention, the catalyst 30 is deposited on the sacrificial support 20 by sputter-coat deposition. In some embodiments of the invention, the catalyst 30 is deposited to a concentration of between about $0.01$ mg/cm$^2$ and $1.00$ mg/cm$^2$. In some embodiments of the invention, the catalyst 30 is deposited to a concentration of between about $0.05$ mg/cm$^2$ and $0.50$ mg/cm$^2$. In some embodiments of the invention, the catalyst 30 is deposited to a concentration of between about $0.10$ mg/cm$^2$ and $0.25$ mg/cm$^2$. In some embodiments of the invention, the catalyst 30 is deposited to a concentration of about $0.1$ mg/cm$^2$. In FIGS. 3 to 7, the shapes of the catalyst 30 are merely meant to be illustrative and are not necessarily indicative of the actual deposition pattern or thickness of the catalyst at any specific point.

In some embodiments, the catalyst 30 in contact with the outside of the sacrificial support 20 is platinum or platinum alloy and the electrochemical cell is a PEM fuel cell.

Another embodiment of the invention is a component for an electrochemical cell which includes a sacrificial support 20 of water soluble salt and a catalyst 30 in contact with the outside of the sacrificial support 20.

Figure 4:
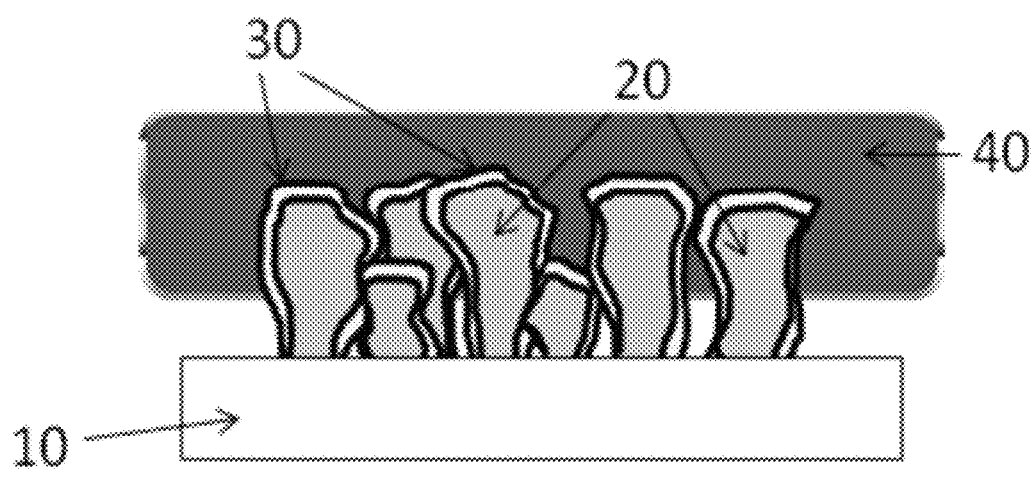
FIG. 4 is an illustration of an electrolyte in contact with a catalyst deposited on a sacrificial support, in accordance with the present invention. The sacrificial support is shown on a substrate.

FIG. 4 illustrates the addition of an electrolyte 40 to the system, such that the electrolyte 40 is in contact with at least some of the catalyst 30. In FIGS. 4 to 7, the shape of the electrolyte 40 is merely meant to be illustrative and is not necessarily indicative of the actual shape of the electrolyte 40. Further, in FIGS. 4 to 7, the amount of contact the electrolyte 40 has with the catalyst 30 is not necessarily indicative of any actual levels, but is again solely for purposes of illustration.

In some embodiments of the invention, the catalyst 30 is brought into contact with an electrolyte 40. In some embodiments of the invention, the electrolyte 40 is a polymer membrane. In some embodiments of the invention, the electrolyte 40 is a proton exchange membrane. In some embodiments of the invention, the polymer membrane is a solubilized perfluorosulfonated ionomer. The catalyst-coated sacrificial support 20 may be transferred to the membrane under heat and pressure. In some embodiments of the invention, the sacrificial support 20 with the catalyst 30 penetrates into the electrolyte 40. For instance, the electrolyte 40 may fill much of the spacing between the sacrificial support "columns" 20 (i.e., at least part way down the length of the column). Other potential electrolytes 40 may be liquids, such as (but not limited to) phosphoric acid, in a mechanical matrix such as SiC or polymer matrix such as PBI (polybenzimidazole), where the catalyst-coated sacrificial support 20 is transferred to the mechanical matrix.

Figure 5:
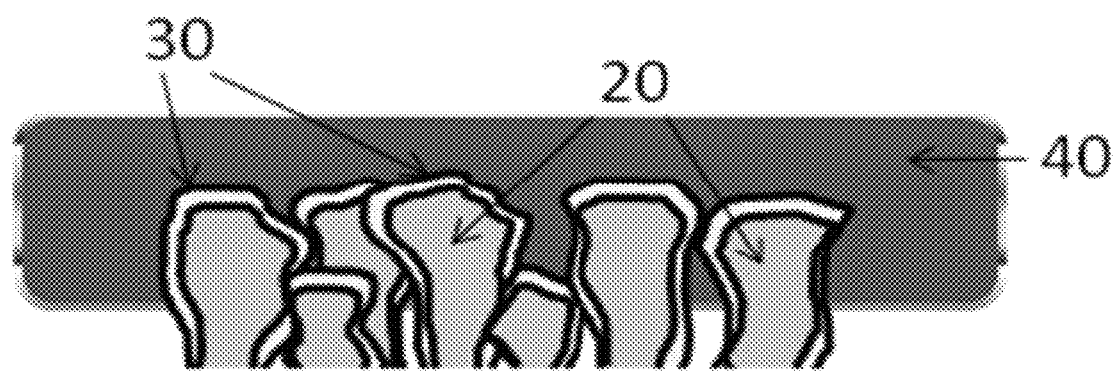
FIG. 5 is an illustration of an electrolyte in contact with a catalyst deposited on a sacrificial support, in accordance with the present invention. The substrate has been removed.

FIG. 5 depicts an embodiment of the invention after the removal of the substrate 10. The substrate 10 is removed after the addition of the electrolyte 40.

Figure 6:
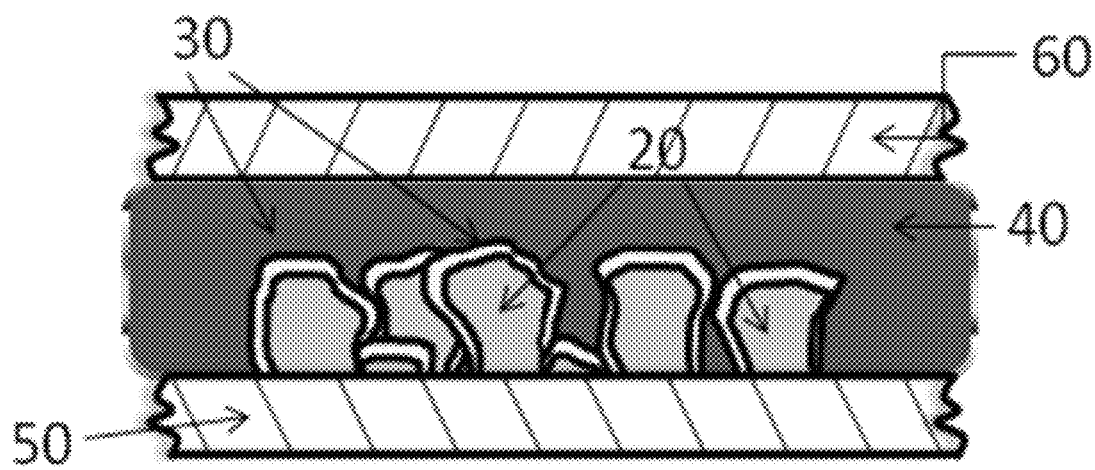
FIG. 6 is an illustration in accordance with the present invention in which a cathode and anode have been added to the electrolyte/catalyst/sacrificial support. This represents the integration of the electrolyte/catalyst/sacrificial support into an electrochemical cell.

FIG. 6 represents an embodiment of the invention after integration into an electrochemical cell. In some embodiments of the invention, the electrolyte 40 and catalyst-coated sacrificial support 20 are integrated into an electrochemical cell. An electrochemical cell refers to any system containing two electrodes (typically an anode and a cathode, shown in this figure by 60 and 50, respectively) and an electrolyte 40. In some embodiments of the invention, the component for an electrochemical cell also includes an electrode 50 which is in contact with the sacrificial support 20. In some embodiments, the component for an electrochemical cell further includes an electrolyte 40 which is in contact with the catalyst 30 and an electrode 50 which is in contact with the sacrificial support 20. In some embodiments of the invention, the electrochemical cell is a PEM fuel cell. In these embodiments, a gas diffusion layer (GDL) is comprised within the electrochemical cell and is attached to the sacrificial support to form a cathode 50. An anode 60 and other fuel cell hardware may then be added in these embodiments. In some embodiments, the electrolyte 40 which is in contact with the catalyst 30 is a proton exchange membrane.

Figure 7:
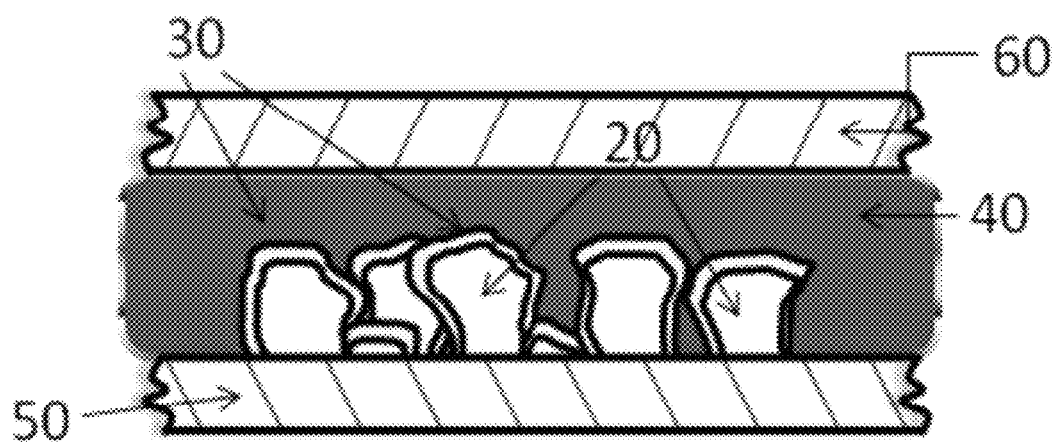
FIG. 7 is an illustration in accordance with the present invention after a potential has been applied to the electrochemical cell. The sacrificial support has been removed.

FIG. 7 illustrates an embodiment of the invention after a potential has been applied to the electrochemical cell. In FIG. 7, all of the sacrificial support 20 has been removed; however, it is not necessarily the case that all of the sacrificial support 20 must be removed, merely that at least some of the sacrificial support 20 will be removed. In some embodiments of the invention, at least a portion of the sacrificial support 20 is removed after the assembly of the electrochemical cell, but prior to operation of the electrochemical cell. In some embodiments of the invention, at least a portion of the sacrificial support 20 is removed during the operation of the electrochemical cell.

In some embodiments of the invention, at least a portion of the sacrificial support 20 is removed by applying a potential greater than 0.8 V. In some embodiments of the invention, at least a portion of the sacrificial support 20 is removed by applying a potential greater than 1.0 V. In some embodiments of the invention, at least a portion of the sacrificial support 20 is removed by applying a potential greater than 1.2 V. In some embodiments of the invention, at least a portion of the sacrificial support 20 is removed by applying a potential greater than 1.5 V. In traditional systems, carbon support oxidation greater than approximately 0.8 V is a well known problem. Therefore, the approach taken here is unique and novel as the invention is utilizing the problem to create novel electrode architectures.

Some embodiments of the invention relate to a method for use in forming an electrochemical cell wherein the electrochemical cell is a proton exchange membrane fuel cell. In these embodiments, the sacrificial support 20 comprises carbon nanorods, and the carbon nanorods are substantially amorphous. The sacrificial support 20 is deposited on the substrate 10 by glancing-angle deposition. In these embodiments, the substrate 10 includes silicon and the catalyst 30 includes a precious metal.

Figure 8:
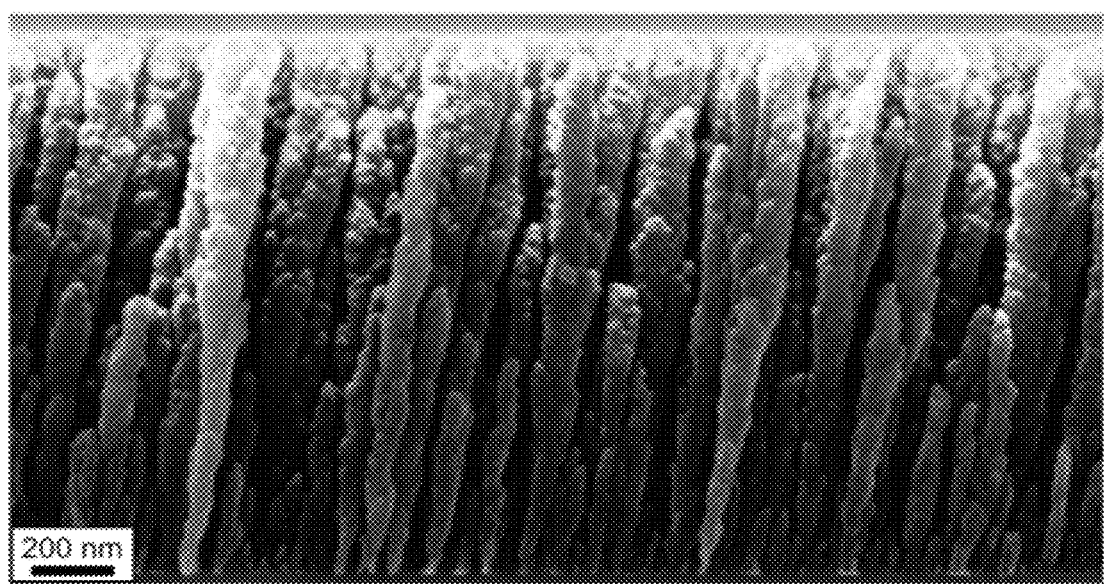
FIG. 8 is a cross-sectional SEM micrograph from 1.5-µm-long carbon nanorods grown by GLAD on a Si wafer and coated with 0.1 mg/cm$^2$ Pt prior to transfer to the membrane.

FIG. 8 is a cross-sectional SEM micrograph from a typical as-deposited Pt/C nanorod electrode prior to transfer to the membrane. The micrograph shows the Si substrate at the bottom, and the Pt-coated C-rod tips at the top. During the subsequent fuel cell assembly, the top will be bonded to the membrane while the Si will be removed and replaced by the cathode GDL, so that oxygen will flow between the rods in the upward direction toward reaction sites at the top. The C rods in this micrograph have a measured length of 1.51 µm, close to the nominal value l=1.5 µm. Their surfaces are rough and show protrusions, a morphology which is characteristic of a hit-and-stick growth mode, and indicate a tendency for branching as reported for GLAD at temperatures that are low with respect to the melting point. The nanorod width increases with height h, from 50-80 nm at h=250 nm to 125-200 nm near the rod tops. Such broadening is typical for GLAD on flat substrates and is attributed to the strong atomic shadowing conditions, leading to a competitive growth mode that causes some rods to overgrow others that terminate their growth prematurely. This is clearly observable in FIG. 8, showing a high number density of narrow rods near the substrate but fewer rods with increasing height, as many do not reach the full length of 1.5 µm. At the top, the nanorods appear bright due to the high secondary electron yield of the high-Z Pt coating on the C-rods. The Pt covers primarily the rod tips, but is also observable at the sides of the rods and on tips of some shorter rods, because Pt penetrates through the 50-150 nm wide spaces between the rods during Pt sputter deposition, which is done perpendicular to the substrate (parallel to the rod direction). For this sample, the Pt penetrated as far as 0.7 µm down the length of the rods such that ~50% of the rod-lengths are Pt-covered. Decreasing/leads to a shorter length (albeit a greater proportion) of nanorods being covered with Pt, 0.50 and 0.45 µm for 1.0- and 0.5-µm-long rods, respectively (not shown). The pores between the rods at the bottom of the nanorod layer are relatively small, ≤10 nm. The pore size increases as the rods get further from the substrate. At the bottom is a very dense network of small nanorods with small pores. As they grow, some rods get shadowed out and stop growing, and the ones that continue to grow widen to fill the freed space; the spaces between the remaining taller rods are larger. In addition, it is believed that the carbon forms a thin (<5 nm) nearly continuous layer at the interface with the substrate during the initial stages of growth, since atomic shadowing effects are negligible prior to three-dimensional nucleation on the otherwise flat substrate surface. This dense C-layer represents a mass transport barrier for fuel cell operation but, as demonstrated below, the more important contribution to mass transport losses is associated with $O_2$ diffusion to Pt sites that are buried in the membrane. The latter can be facilitated by C-etching that creates pores in the rods that open up $O_2$ diffusion paths.

Figure 9:
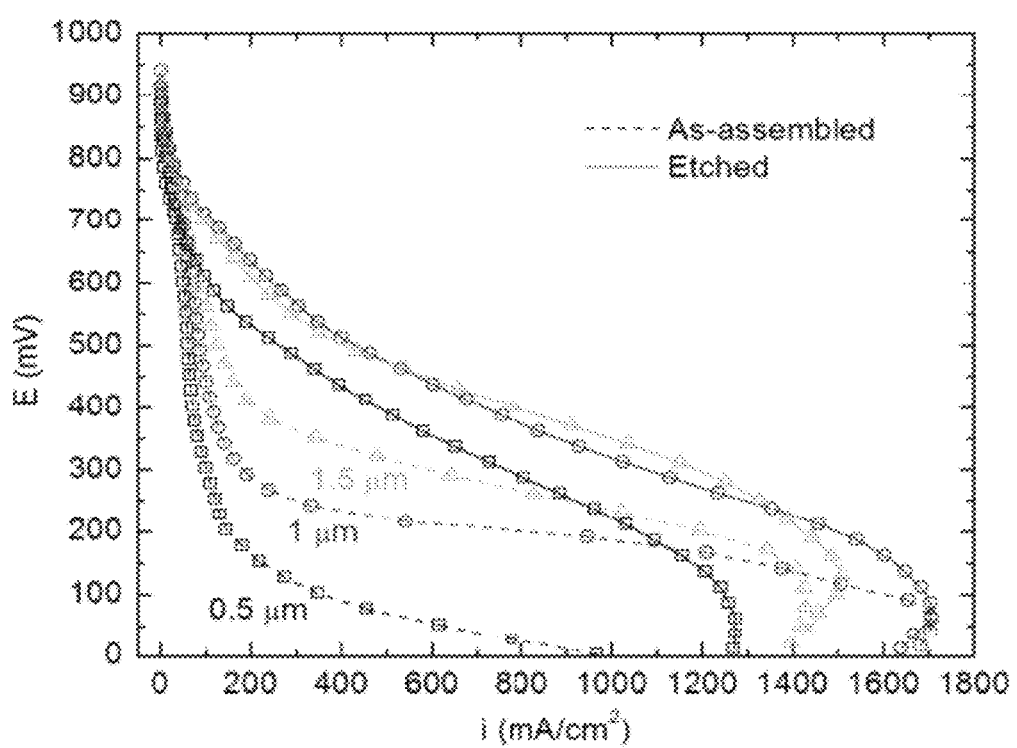
FIG. 9 shows polarization curves from fuel cells with Pt-on-C-nanorod cathodes before and after in situ etching, for rod lengths l=1.5 (triangles), 1.0 (circles), and 0.5 µm (squares).

FIG. 9 shows polarization curves for Pt-coated C nanorod cathodes with 0.1 mg/cm$^2$ Pt and C rod-lengths of l=0.5, 1, and 1.5 µm. The dashed lines are obtained from as-assembled cells, that is, prior to in situ etching of the C-rods. The solid lines represent the I-V characteristics from the same cells after 60 to 180 etch cycles, corresponding to a total charge applied to the cathode of each cell of Q=11 C/cm$^2$. The polarization curves for all three as-assembled cells exhibit a steep decrease in E with increasing i, dropping to a potential at i≈150 mA/cm$^2$ of 200, 300, and 400 mV for l=0.5, 1, and 1.5 µm, respectively. At higher current, the curves show a more moderate slope before they reach their maximum transport-limited current of 1.3-1.7 A/cm$^2$. The initial steep decrease is associated with activation polarization the moderate slope from 150-1000 mA/cm$^2$ can be attributed to increased proton conduction due to electrode wetting by product water. The fuel cell current increases with increasing C nanorod length, although the Pt loading remains constant.

For example i=72, 114, and 195 mA/cm² at E=0.40 V, and i=5.9, 9.1, and 8.4 mA/cm² at E=0.85 V, for l=0.5, 1, and 1.5 µm, respectively. This increase in efficiency, which is particularly strong at low potential, can be attributed to (i) the larger rods having wider spaces, which increase from 25-65 nm for l=0.5 µm to 50-150 nm for l=1.5, facilitating $O_2$ transport within the electrode, and (ii) to Pt being spread over a larger rod surface area for the longer nanorods, covering a depth of 450 nm for l=0.5 µm but 750 nm for l=1.5 µm (as discussed above), thus increasing the total surface area of catalyst.

The solid lines in FIG. 9 are the polarization curves from the cells after nanorod etching. At high potential E=0.85 V, the current is 30-70% lower than for the as-assembled cells, which can be attributed to lost Pt surface area, as discussed below. In contrast, the output current after etching is considerably higher for all E<0.7 V and all three cells. For example at 0.40 V, i increases due to the etching process by factors of 6.7, 6.3, and 4.0 to reach 481, 714, and 779 mA/cm² for l=0.5, 1, and 1.5 µm, respectively. This substantial increase in current can be attributed to enhanced oxygen transport within the electrode. Carbon removal during etching results in the formation of pores within the rods near the Pt catalyst, improving the oxygen transport to sites that are buried in the electrolyte. The performance difference between short and long rods is less pronounced after the etching process. For example, i at E=0.4 V increases by 58% and 71% as l increases from 0.5 to 1.0 µm and from 1.0 to 1.5 µm, while the corresponding increases after C etching are only 48% and 9%. This reduced sensitivity in l after etching is attributed to the removal of the mass transport limitation that causes strong differences for the as-assembled case. After etching, a lower mass transport overpotential yields a more similar performance for the three cells.

Figure 10:
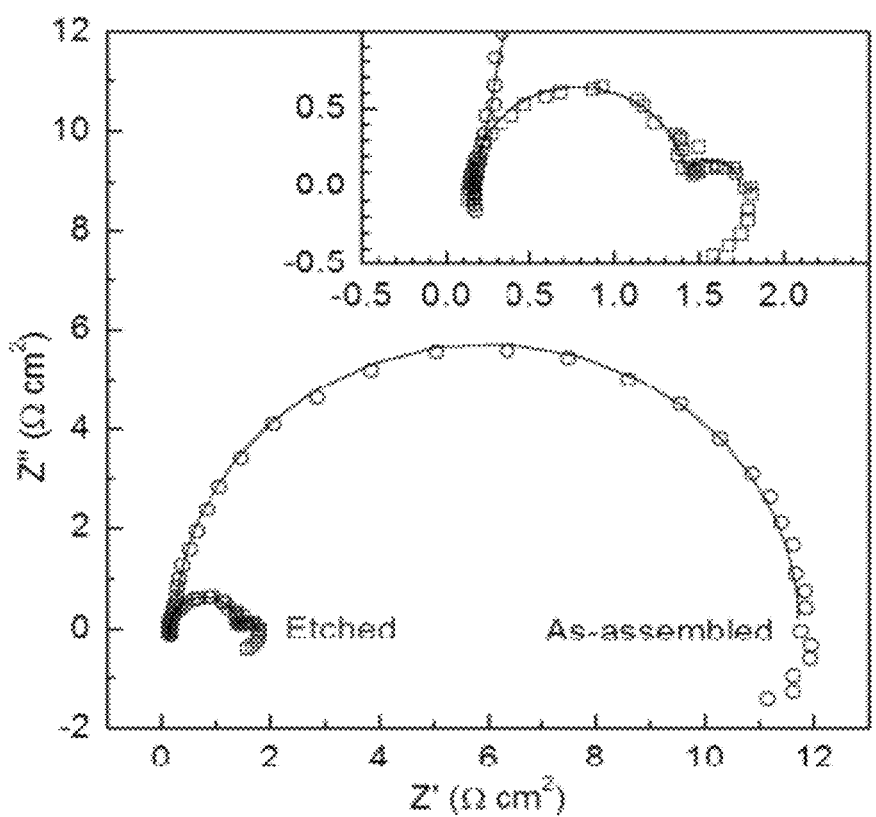
FIG. 10 is a typical complex-plane impedance plot at E=0.50 V from a carbon nanorod cathode fuel cell before and after Q=11 C/cm$^2$ etching. The solid lines are obtained by fitting the experimental data with an equivalent circuit model.

FIG. 10 is a typical complex-plane impedance plot before and after etching, from a cell with l=1.0 µm nanorods at E=0.5 V. The data points show the impedance for the total measured frequency range 0.1 Hz-10 kHz, while the solid lines are obtained by fitting the data with an equivalent circuit model. The impedance curve from this model exhibits in principle two arcs: a high-frequency arc on the left due to the charge transfer resistance $R_{CT}$ and the double layer capacitance $C_{DL}$, and a lower frequency arc on the right associated with the mass transport resistance $R_{MT}$ and capacitance $C_{MT}$. Values for these four parameters, $R_{CT}$, $C_{DL}$, $R_{MT}$, and $C_{MT}$, were obtained from data fitting, which also provided values for the parasitic inductance L and the series resistance $R_M$. The curve for the as-assembled cell in FIG. 10 exhibits one dominant arc that is associated with the mass transport resistance $R_{MT}$=11.5 Ωcm². This value is just slightly below the low frequency intercept at 11.7 Ωcm², indicating that $R_{MT}$ comprises the vast majority of the total overall cell impedance. In contrast, the fuel cell after the etching procedure exhibits an impedance curve with two well-distinguishable arcs, as also plotted in a higher magnification in the inset in FIG. 10. The mass transport resistance $R_{MT}$=0.033 Ωcm² is 360 times lower than for the as deposited cell, and the associated capacitance is two orders of magnitude larger, with $C_{MT}$=2.6 and 260 mC/cm² for the as-assembled and etched cell, respectively. This change in mass transport resistance and capacitance fully accounts for the dramatic increase in current associated with C etching, from i=85 to 430 mA/cm², as observed in FIG. 9. In addition, the EIS analysis shows that the series resistance decreases slightly during etching, from $R_M$=0.16 to 0.14 Ωcm², which may be attributed to the preferential removal of the least stable, most-resistive carbon clusters. The etching also causes the charge transfer resistance to increase and the double layer capacitance to decrease both by an order of magnitude, from $R_{CT}$=0.1 to 1.3 Ωcm² and from $C_{DL}$=6.7 to 0.65 mC/cm², respectively, which is likely due to the secondary effect of Pt surface area loss due to Pt particle growth and ion migration into the electrolyte during the etching process, as further explained below. This loss in active Pt surface area is more than offset by the formation of pores in the carbon nanorods during the etching process, yielding enhanced mass transport and access to buried Pt in the membrane electrolyte.

Figure 11:
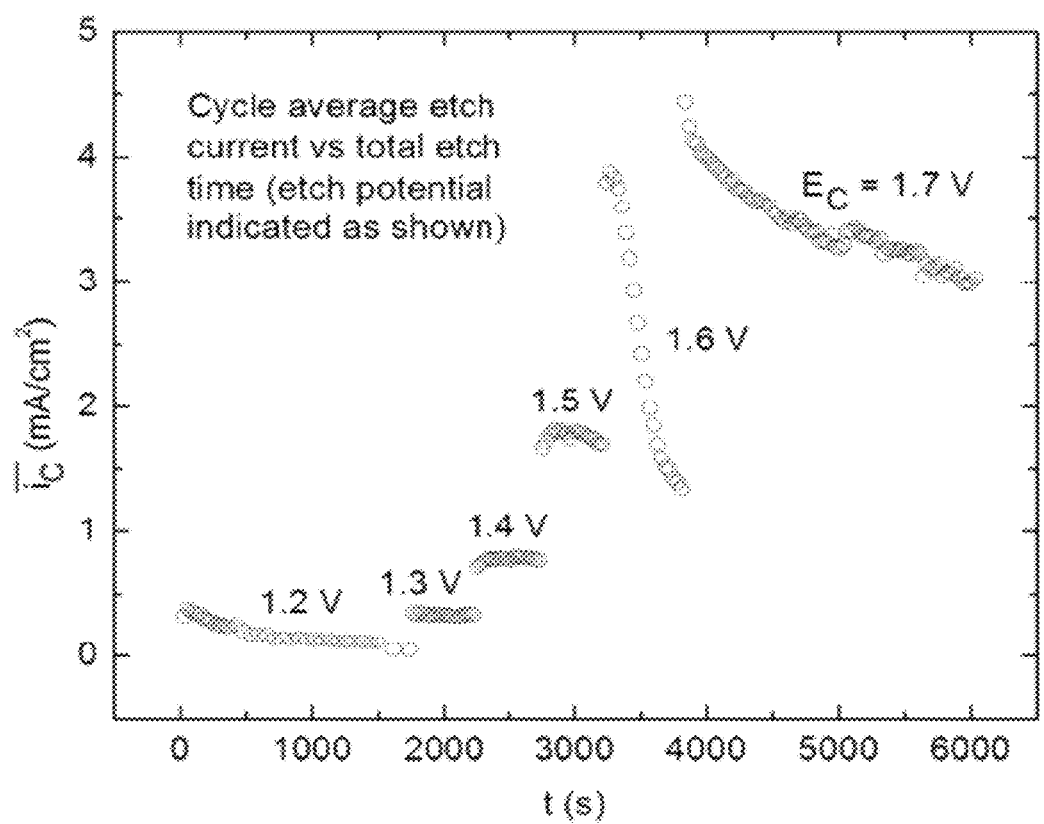
FIG. 11 is a plot of the average etch cycle current $\bar{i_C}$ vs. total etch time t, for a cell with 1.5-µm-long nanorods. Each data point represents the average etch current during one cycle at a constant potential $V_E$=1.2, 1.3, 1.4, 1.5, 1.6, or 1.7 V, as indicated.

FIG. 11 is a plot of the cycle-average etch current $\overline{i_C}$ vs total etch time t for a cell with l=1.5 µm. For this experiment, the etch voltage $V_E$ is initially set to 1.2 V and is increased stepwise by 0.1 V increments with 20-50 cycles for each constant $V_E$ value, as indicated in FIG. 11. The measured $\overline{i_C}$ increases from 0.1 to 0.3 to 0.8 to 1.8 mA/cm² for $V_E$=1.2, 1.3, 1.4, and 1.5 V, respectively, with $\overline{i_C}$ remaining approximately constant at each fixed $V_E \leq 1.5$ V. In contrast, raising $V_E$ to 1.6 V leads to a relatively large $\overline{i_C}$=3.9 mA/cm² which, however, decreases monotonically with t to reach 1.3 mA/cm² after 20 cycles at $V_E$=1.6 V. Similarly, the subsequent increase to $V_E$=1.7 V leads to another considerable raise in $\overline{i_C}$ which also continuously decreases from 4.4 to 3.0 mA/cm². The observed increase in etch current with increasing $V_E$ can be attributed to any combination of the three reactions, water electrolysis, Pt oxidation and C oxidation, since the rate for each of them is expected to increase with $V_E$. The observation in FIG. 11 that the slope $d\overline{i_C}/dt$ is small or negligible for $V_E \leq 1.5$ V indicates that there is no change in the cell reactions with repeated etch cycles with the same $V_E$, suggesting that the measured current represents a steady state reaction rate for $V_E \leq 1.5$ V. Considering the three contributing reactions, a steady state contribution is expected from (i) the water electrolysis since water fuel is continually replenished by the humidified reactant streams and periodic excursion into fuel cell mode between etching cycles, and from (ii) Pt oxidation since Pt is reduced between etch cycles when the cell is operated in fuel cell mode with E<1.0 V, (with the exception of Pt particle growth and ions migrating into the electrolyte, as further described below), but a continuously changing contribution is expected from (iii) C oxidation, since $CO_x$ leaves the electrode, resulting in an irreversible change to the morphology of the nanorods. Therefore, it is theorized that the dominant contributions to $\overline{i_C}$ occurring at $V_E \leq 1.5$ V are the recoverable water electrolysis and Pt oxidation currents, while the decrease in $\overline{i_C}$ with etch time for $V_E$=1.6 and 1.7 V is due to changes in the C-rod morphology associated with C oxidation. In particular, the steep decrease in $\overline{i_C}$ for $V_E$=1.6 V is attributed to removal of small particles of amorphous carbon near the Pt interface, which are more easily oxidized than graphitic C, while $V_E$=1.7 is high enough to cause sustained etching of the bulk C nanorods. Also noted is that $\overline{i_C}$ decreases initially at $V_E$=1.2 V from 0.38 to 0.044 mA/cm², which can be attributed to a combination of two irreversible Pt oxidation processes: (1) Pt particle growth via Ostwald ripening to form larger, more stable particles, and (2) migration of Pt ions into the electrolyte. This loss in active Pt area results in a decrease in output current particularly at high potential where mass transport effects are small, as noted above when discussing the polarization curves, and evident from the results below.

Figure 12:
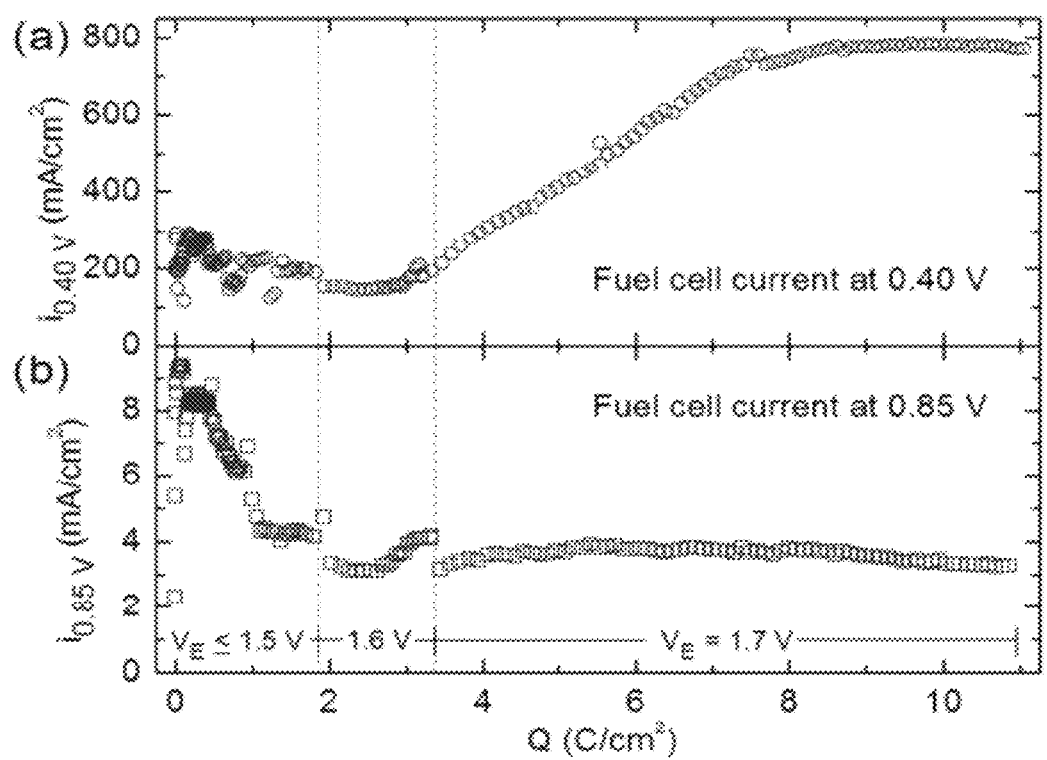
FIG. 12 shows plots of the fuel cell output current at (a) 0.40 V and (b) 0.85 V vs. cumulative etch charge Q, obtained from polarization curves between individual etch cycles.

The plots in FIG. 12 show the current in fuel cell mode vs. the total etch charge Q, from the same etching experiment as used for FIG. 11. The current at (a) 0.40 V and (b) 0.85 V are extracted from polarization curves that are obtained after each etch cycle. As above, the etch voltage $V_E$ is stepwise increased, such that $V_E \leq 1.5$ V for Q<1.9 C/cm², $V_E$=1.6 V for 1.9<Q<3.4 C/cm², and $V_E$=1.7 V for Q>3.4 C/cm², as indicated at the bottom of FIG. 12(b). The output current $i_{0.40\ V}$ at E=0.40 V shown in FIG. 12(a) decreases initially from 294 to 145 mA/cm$^2$ while exhibiting relatively high cycle-to-cycle variations, which are attributed to fluctuating mass transport conditions due to Pt agglomeration. The current is more stable for $V_E \geq 1.6$ V, and begins to rise at Q=2.9 C/cm$^2$. For $V_E$=1.7 V, the current increases monotonically for Q<8.5 C/cm$^2$ and then remains approximately constant at $i_{0.40\ V}$=780 mA/cm$^2$, which is more than 5× larger than the minimum value. The increase in $i_{0.40\ V}$ is the result of carbon etching that opens up pores within the rods to reaction sites which were previously only accessible to oxygen via migration through the electrolyte. The constant $i_{0.40\ V}$ value for Q>8.5 C/cm$^2$ suggests that the rods are completely oxidized such that further etching leaves the pore structure near the Pt unchanged. FIG. 12(b) shows the current at E=0.85 V, which exhibits a maximum $i_{0.85\ V}$=9.4 mA/cm$^2$ at Q=0.071 C/cm$^2$, and decreases to reach an approximately constant minimum value between 3.1 and 4.1 mA/cm$^2$ for Q>1.2 C/cm$^2$. The initial maximum and subsequent decay is the result of Pt particle growth and Pt$^{2+}$ ions migrating into the electrolyte, as mentioned above. These two processes cause a loss in active Pt surface area and an associated decrease in the high-potential fuel cell performance, where mass transport effects are negligible. This decrease is consistent with the increase in charge transfer resistance and decrease in double layer capacitance observed in the EIS spectra after etching (FIG. 10). The corresponding low-potential decrease in FIG. 12(a) is relatively moderate, since $i_{0.40\ V}$ is more sensitive to mass transport than active catalyst area. The decrease is more than compensated by the development of pores for $V_E \geq 1.6$ V which facilitate O$_2$ transport to catalyst sites.

Figure 13:
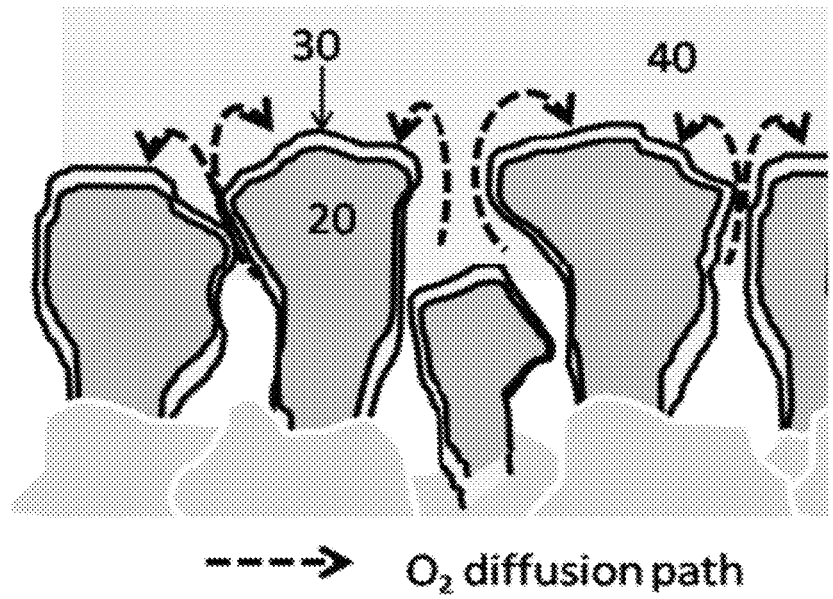
FIG. 13 illustrates the electrochemical etching of the sacrificial support. The upper portion of the figure shows access to the catalyst before etching, while the bottom portion of the figure illustrates the increased access to the catalyst after etching of the sacrificial support.
Figure 14:
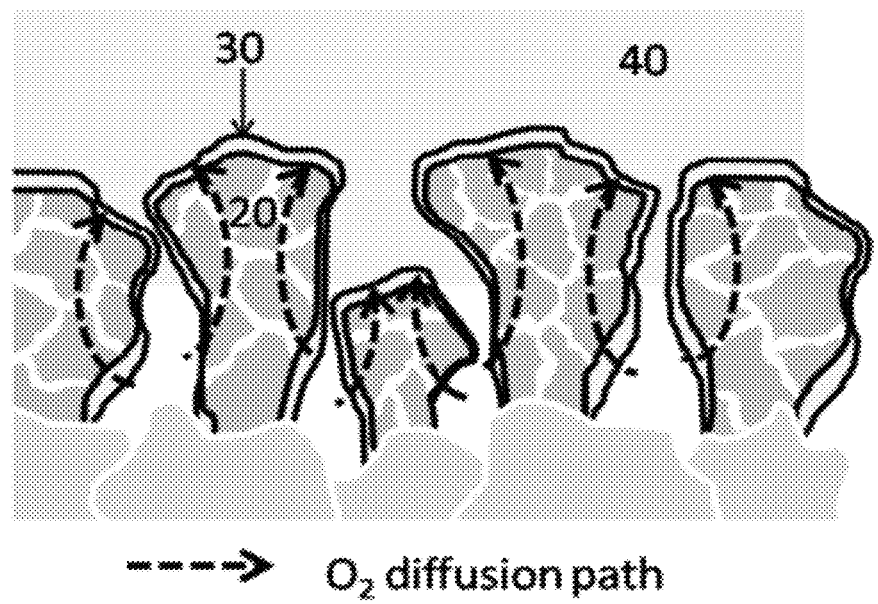

FIG. 13 illustrates the etching of the sacrificial support 20 by oxidation. The arrows represent the path that the oxygen takes. In the top illustration, it is evident that only a portion of the catalyst 30 on the outside of the sacrificial support 20 is available for use. The oxygen must travel around the sacrificial support 20, resulting in a decrease in mass transport. The bottom illustration, however, shows the advantage of the current invention, in that the formation of pores due to the oxidation of the sacrificial support 20 allows for more availability of the catalyst. The oxygen can diffuse through the rods, enhancing mass transport.

In some embodiments of the invention, the electrochemical cell may additionally contain a permanent, inert secondary scaffold. Permanent skeleton structures made of something that is not etched can also be integrated into the electrode 50 to maintain a rigid structure after the sacrificial support 20 is removed. This permanent skeleton structure could be any noble metal (such as Au, Pt, Cu), polymer (like Teflon) or other materials.

It can be envisioned that electrodes can be made which are layered or inter-mixed structures containing sacrificial substrates 20 removable by the normal operation of the electrochemical cell. The etching that results from this operation would then open up pores between the layers.

The sacrificial support, for instance carbon nanorods, can be grown with controllable pore size. In addition, by patterning the substrate before the deposition of the sacrificial support, the pore size and pore size distribution can be further controlled. Hence it is possible to control the pore size, pore size distribution, and aspect ratio of the pores left behind when the sacrificial support is etched away. The shape of the catalyst left behind post-etch can also be controlled in this way.

Because etching is fast—as short as seconds—the etching step can be performed in stages, testing the electrochemical cell performance between each etch cycle, and stopping when performance is maximized. In one embodiment, the cell is etched at 1.7 V in successive 60 sec cycles. After each cycle, the cell is run in fuel cell mode and the output current at some representative voltage such as 0.6 V is measured and recorded after each cycle. When the output current at 0.6 V no longer substantially increases, then the etching procedure is considered complete. Further, the etching can be performed during "incubation", the process in which electrochemical cells are rehydrated and otherwise activated for use before being installed into the cell system.

Experimental Section

The controllable formation of pores within an electrode after assembly into an operational electrochemical cell is demonstrated. A model materials system is used as the cathode electrode consisting of Pt-coated C-nanorods (carbon nanorods) that are deposited by GLAD and conventional sputtering. After assembly into a fuel cell, the C-rods are etched away by raising the cell potential above the reversible voltage $E_0$ (=1.23 V at standard conditions), so that the current reverses direction and the cell electrolyzes water, with side oxidation reactions of Pt and C. The C oxidation is well known for PEM fuel cells as a degradation problem for C supports. Here, however, the same C oxidation is exploited to convert the temporary C-support, which supports Pt during assembly, into gas phase products CO and $CO_2$ that exit the cell. The resulting pores facilitate efficient mass transport and yield a fourfold increase in fuel cell output current at low potentials.

In one embodiment, a fuel cell cathode is made in the following way: carbon nanorods are deposited onto a Si substrate by glancing-angle deposition (GLAD), and then the rods are coated with Pt. The Pt-coated nanorods are then transferred to the membrane under heat and pressure, and the Si substrate is peeled off and discarded. The membrane might flow into the voids between the nanorods. The cell is then assembled and operated as a fuel cell. The cell is then connected to a current source and brought to a high potential (V>1.23V). At this potential, water is electrolyzed (split) at the cathode. As a side reaction, carbon is oxidized to CO and $CO_2$ and leaves the cell. Depending on the voltage, current, and time, the carbon nanorods are removed, opening pores of controlled size and density. The carbon acts as a sacrificial support, mechanically supporting the Pt during the assembly of the cell. When the carbon is removed, pores enable oxygen to reach all parts of the catalyst and more efficiently utilize the precious metal Pt. The fact that carbon leaves as a relatively inert gas (mostly $CO_2$) makes it particularly attractive because there are no ions to dissolve into and poison the membrane or catalyst.

Layers of 150-nm-wide and 0.5 to 1.5-μm-long carbon nanorods were grown by electron beam evaporation glancing angle deposition (GLAD) on Si substrates, magnetron sputter coated with 0.10 mg/cm$^2$ Pt, and transferred to polymer electrolyte membranes (PEMs) for testing as cathode electrodes in fuel cells with pure $H_2$ and $O_2$ reactants. The C-rods were etched within fully assembled cells by applying a potential above the reversible $H_2/O_2$ voltage of 1.23 V. This leads to polarization curves that show a 6.7, 6.3, and 4.0 times higher current at 0.40 V after etching with a total charge of Q=11 C/cm$^2$, for rod lengths of 0.5, 1, and 1.5 μm, respectively. The current increase is attributed to the opening of pores within the electrode, which facilitates easy oxygen transport and leads to a reduction in mass transport resistance by a factor of 360, as determined by electrochemical impedance spectroscopy (EIS). Etching sequences with increasing voltage $V_E$ suggest that $V_E \leq 1.5$ V yields water electrolysis and Pt oxidation that facilitates Pt agglomeration and migration of Pt ions into the electrolyte with an associated 30-70% decrease in reaction sites and output current at a high fuel cell potential of 0.85 V. However, $V_E$=1.7 V results in removal of C and the formation of pores within C rods that facilitate oxygen transport to catalyst reaction sites, yielding a 400-700% increase in fuel cell output current at a low potential of 0.40 V. These results suggest that the controlled etching of temporary supports to create pores in an operating fuel cell may be an effective approach to reduce mass transport limitations.

EXAMPLE 1

Carbon (C) nanorod layers were grown at room temperature onto 3.5×3.5 cm$^2$ Si wafers in a load-locked evaporation system with a base pressure of <5×10$^{-8}$ Torr, using a 4.3 keV and 0.45 A electron beam (e-beam) impinging on a 0.64-cm-diameter rod-fed carbon source that was positioned 15 cm from the substrate. The deposition angle, measured between the substrate surface normal and the source center was set to α=85°, which is a typical value for GLAD. The substrates were continuously rotated at 40 rpm (0.67 Hz) to facilitate growth perpendicular to the substrate surface. The deposition rate was measured with a water-cooled crystal sensor flux monitor (Inficon) and was maintained between 0.03 to 0.17 μg cm$^{-2}$s$^{-1}$, corresponding to C nanorod growth rates of 0.3 to 1.5 nm/s assuming a density of 2.25 g/cm$^3$ and 50% porosity. The nanorods were coated with Pt in the same deposition system using magnetron sputtering at room temperature in a 3.0 mTorr 99.999% pure Ar discharge. A dc power of 50 W was applied to a 5.1-cm-diameter 99.99% Pt target at 11 cm from the substrate with α=0°, yielding a growth rate of 0.25 nm/s, corresponding to a Pt loading rate dw/dt of 0.55 μg cm$^{-2}$s$^{-1}$, as determined by differential weighing of samples up to 4 mg in an electronic semi-micro balance (Sartorius 2024 MP6, standard deviation±0.02 mg). The Pt loading for all cells was w=0.1 mg/cm$^2$. Scanning electron microscopy (SEM) was performed on a Carl Zeiss Supra 55 in secondary electron mode at 5 kV accelerating voltage.

The Pt-coated C electrodes were integrated as cathodes into fuel cells with 10 cm$^2$ active area, using Dupont Nafion® NRE-212 (Ion Power) membranes and anode electrodes with w=0.25 mg/cm$^2$ (E-TEK LT120EWALTSI). The membranes were activated by boiling in 0.5 M H$_2$SO$_4$ followed by three separate 30 min boiling steps in deionized water, and stored in deionized water until simultaneous bonding to both electrodes at 126° C. and 350 psi (2.4 MPa) for 5 min. After bonding, the Si substrate was easily peeled away and discarded, leaving the Pt-coated C nanorods embedded in the membrane. The cathode GDL (SIGRACET 35BC, SGL Technologies GmbH) was placed on top of the electrode and the package subsequently assembled into fuel cell hardware. Fuel cells were operated at 70° C. with atmospheric pressure reactants humidified to a dew point of 70° C., that is, 100% relative humidity. Pure hydrogen and oxygen were fed to the anode and cathode with a stoichiometric ratio of λ=1.2 for 2.0 A/cm$^2$ (167 and 84 sccm, respectively). Prior to testing, the cells were "incubated" at 0.4 V for at least 24 h or until the output current stabilized. Polarization curves, electrochemical impedance spectroscopy (EIS), and etching cycles were performed with a potentiostat (Parstat 2273, Princeton Applied Research). Polarization curves were obtained using a scan rate of 1 mV/s in the downward (decreasing voltage) direction. EIS was performed under steady-state conditions using a sinusoidal voltage perturbation from 0.1 Hz to 10 kHz with a root mean square amplitude of 10 mV. Each EIS spectrum was analyzed by modulus-weighted least-squares fitting using the commercial software package ZView (Scribner Associates), and fit to an equivalent circuit model comprising a series of two parallel-RC elements corresponding to activation and mass transport processes, and a series membrane resistance.

Etching cycles were performed by maintaining the humidified reactant flow and increasing the cell voltage to a constant value ranging from 1.2 V≤$V_E$≤1.7 V, or by applying a constant etching current $i_E$=3 mA/cm$^2$. The total charge Q applied to the cell is the sum over the charges $Q_C$ for each etch cycle, which are obtained by integrating over the current during each cycle $Q_C=\int_0^{t_C} i_C dt$, where $t_C$ is the length of the cycle and $i_E$ is the etching current at time t. The measured $i_E$ is composed of a mixture of water electrolysis, Pt oxidation, and carbon etching. It is typically highest at the beginning of a cycle and decreases monotonically during each cycle, because the current due to water electrolysis drops as water within the electrode is consumed. A similar current decrease has also been reported previously and was attributed to the buildup of corrosion-inhibiting surface oxide films. These experiments do not allow quantitative distinction between the different contributions to the current, and in the following Q is referred to as the etching charge and $\overline{i_C}=Q_C/t_C$ is the average current for a cycle, even though only a fraction of the current is actually used for C-etching. A series of $t_C$=30-120 s long etching cycles with a typical $Q_C$≈0.1 C/cm$^2$ per cycle were performed in an automated sequence, and a fuel cell polarization curve was collected in between each cycle. All electrodes were considered fully etched at a total Q=11 C/cm$^2$, as the longest 1.5 μm carbon nanorods would be fully etched assuming a Faradaic current efficiency of 50% with a porosity of 50% and density of 2.25 g/cm$^3$.

The as-assembled fuel cell performance depends on the nanorod length l, which affects both the total Pt surface area and the electrode porosity. In situ carbon etching using a total charge Q=11 C/cm$^2$ increases the output current at 0.40 V by a factor of 4 to 7. This increase in current at 0.40 V is associated with pore formation during the etching process which enhances O$_2$ transport to catalyst sites. This is confirmed by EIS which shows that the mass transport impedance at 0.50 V dominates the as-assembled cell spectrum, but is reduced by a factor of 360 during etching. Etching cycles at low potential 1.2 V≤$V_E$≤1.5 V have negligible effect on C-etching but cause Pt agglomeration and migration into the electrolyte, which reduces the high-potential output current $i_{0.85\ V}$ by a factor of ~2. Etching at $V_E$1.6-1.7 V results in irreversible morphological changes in the C-support rods which are evidenced by a dramatic increase in $i_{0.04\ V}$ by over a factor of 5. These results suggest that in situ oxidation of carbon support structures are a promising new approach to form pores within high-surface area 3-D nanostructured PEM fuel cell cathodes, providing a scalable process to enhance mass transport.

High surface area electrodes are created within the assembled cell and therefore are not vulnerable to damage by being handled outside the cell. Surface areas previously unattainable may now be reached.

While various embodiments of the present invention have been illustrated and described, it will be appreciated by those skilled in the art that many further changes and modifications may be made thereunto without departing from the spirit and scope of the invention. For instance, any process in which an electrochemical cell electrode is made by coating a sacrificial support, and then removing at least a portion of that support in the operating electrochemical cell is envisioned by this invention. This includes electrochemically etching, by bringing the cell to high potential to oxidize the support. It also includes using a material which will dissolve in the cell (such as water-soluble salts) without electrochemical etching.

What is claimed is:

1. A method for use in forming an electrochemical cell, comprising the sequential steps of:
    providing a sacrificial support on a substrate wherein said sacrificial support comprises carbon nanorods or a water-dissolvable salt;
    depositing a catalyst on the sacrificial support;
    bringing the catalyst into contact with an electrolyte;
    removing the substrate;
    integrating said sacrificial support, catalyst and electrolyte into an electrochemical cell; and
    removing at least a portion of said sacrificial support during the operation of said electrochemical cell.

2. The method of claim 1 wherein said catalyst comprises a precious metal or an alloy of a precious metal.

3. The method of claim 1 wherein said electrochemical cell is a proton exchange membrane fuel cell.

4. The method of claim 1 wherein said sacrificial support is deposited on said substrate by glancing-angle deposition (GLAD) or by sputter-coat deposition.

5. The method of claim 1 wherein said sacrificial support is removed by applying a potential greater than 0.8 V.

6. The method of claim 1 wherein said carbon nanorods are between about 50 nm to 200 nm wide.

7. The method of claim 1 wherein said carbon nanorods are about 0.5 to 1.5 µm long.

8. The method of claim 1 wherein said carbon nanorods are about 50 to 150 nm apart.

9. The method of claim 1 wherein said catalyst is deposited to a concentration of about 0.1 mg/cm$^2$.

10. The method of claim 1 wherein said integrating into an electrochemical cell comprises affixing a gas diffusion layer to the said sacrificial support after the substrate has been removed.

11. The method of claim 1 further comprising a permanent, inert secondary scaffold.

12. The method of claim 1 wherein
    said electrochemical cell is a proton exchange membrane fuel cell;
    said sacrificial support comprises carbon nanorods;
    said substrate comprises silicon; and
    said catalyst comprises a precious metal;
    wherein said sacrificial support is deposited on said substrate by glancing-angle deposition.

13. The method of claim 1 wherein said electrolyte comprises a polymer membrane.

14. A component for an electrochemical cell, comprising: a sacrificial support comprising substantially amorphous carbon nanorods; and a catalyst in contact with an outside of said sacrificial support, said catalyst forming a continuous catalyst layer on said sacrificial support, said catalyst layer incompletely surrounding said sacrificial support so as to form a cavity open at one end and occupied by said sacrificial support.

15. A component for an electrochemical cell according to claim 14 further comprising:
    an electrolyte which is in contact with said catalyst; and
    an electrode which is in contact with said sacrificial support.

16. A component for an electrochemical cell according to claim 15 wherein said electrolyte which is in contact with said catalyst is a proton exchange membrane.

* * * * *

UNITED STATES PATENT AND TRADEMARK OFFICE
CERTIFICATE OF CORRECTION

Page 1 of 1

PATENT NO. : 8,980,502 B2
APPLICATION NO. : 13/378113
DATED : March 17, 2015
INVENTOR(S) : Gasda et al.

It is certified that error appears in the above-identified patent and that said Letters Patent is hereby corrected as shown below:

On the Title Page

In the Inventors: item (75): Delete "Michael David Gasda, Mountain View, NY (US)"

And insert -- "Michael David Gasda, Mountain View, CA (US)" --

Signed and Sealed this
Twenty-fifth Day of August, 2015

Michelle K. Lee
*Director of the United States Patent and Trademark Office*